(12) United States Patent
Staffler et al.

(10) Patent No.: US 12,086,214 B2
(45) Date of Patent: Sep. 10, 2024

(54) METHOD AND DEVICE FOR CREATING A MACHINE LEARNING SYSTEM

(71) Applicant: Robert Bosch GmbH, Stuttgart (DE)

(72) Inventors: Benedikt Sebastian Staffler, Tuebingen (DE); Jan Hendrik Metzen, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 495 days.

(21) Appl. No.: 17/344,203

(22) Filed: Jun. 10, 2021

(65) Prior Publication Data
US 2022/0004806 A1 Jan. 6, 2022

(30) Foreign Application Priority Data

Jul. 2, 2020 (DE) .......................... 102020208309.6

(51) Int. Cl.
| | | |
|---|---|---|
| *G06F 18/20* | (2023.01) | |
| *G06F 18/21* | (2023.01) | |
| *G06N 5/04* | (2023.01) | |
| *G06N 20/00* | (2019.01) | |
| *G06T 7/11* | (2017.01) | |
| *G06V 20/58* | (2022.01) | |

(52) U.S. Cl.
CPC .......... *G06F 18/285* (2023.01); *G06F 18/217* (2023.01); *G06N 5/04* (2013.01); *G06N 20/00* (2019.01); *G06T 7/11* (2017.01); *G06T 2207/20072* (2013.01); *G06T 2207/20081* (2013.01); *G06V 20/58* (2022.01); *G06V 2201/06* (2022.01)

(58) Field of Classification Search
None
See application file for complete search history.

(56) References Cited

U.S. PATENT DOCUMENTS

| | | | | |
|---|---|---|---|---|
| 10,818,035 | B1* | 10/2020 | Guo | .......................... G06N 3/08 |
| 10,891,240 | B2* | 1/2021 | Mathew | ................ G06F 3/0683 |
| 11,361,449 | B2* | 6/2022 | Ramezani | ............. G01S 7/4808 |
| 2007/0087756 | A1* | 4/2007 | Hoffberg | .......... G06Q 10/06375 |
| | | | | 455/450 |
| 2007/0152804 | A1* | 7/2007 | Breed | ..................... G01S 17/86 |
| | | | | 701/301 |

(Continued)

FOREIGN PATENT DOCUMENTS

WO 2019084560 A1 5/2019

OTHER PUBLICATIONS

He et al., "Joint Design of Training and Hardware Towards Efficient and Accuracy-Scalable Neural Network Inference," IEEE Journal on Emerging and Selected Topics in Circuits and Systems, vol. 8, No. 4, Dec. 2018 (Year: 2018).*

(Continued)

*Primary Examiner* — Soo Shin
(74) *Attorney, Agent, or Firm* — NORTON ROSE FULBRIGHT US LLP; Gerard A. Messina (57) ABSTRACT

A method for creating a machine learning system which is designed for segmentation and object detection in images. The method includes: providing a directed graph; selecting a path through the graph, at least one additional node being selected from this subset, a path through the graph from the input node along the edges via the additional node up to the output node being selected; creating a machine learning system as a function of the selected path; and training the machine learning system created.

7 Claims, 11 Drawing Sheets

(56) References Cited

U.S. PATENT DOCUMENTS

| | | | |
|---|---|---|---|
| 2007/0228703 A1* | 10/2007 | Breed | B60R 21/232 |
| | | | 280/740 |
| 2018/0307188 A1* | 10/2018 | Mummadi | G06N 3/045 |
| 2018/0330258 A1* | 11/2018 | Harris | G06N 7/01 |
| 2019/0258251 A1* | 8/2019 | Ditty | G05D 1/0248 |
| 2020/0175339 A1* | 6/2020 | Viswanathan | G06V 20/56 |
| 2021/0004021 A1* | 1/2021 | Zhang | G06T 19/00 |
| 2021/0232929 A1* | 7/2021 | Zoph | G06N 3/047 |
| 2021/0365782 A1* | 11/2021 | Huang | A63F 13/335 |
| 2022/0309685 A1* | 9/2022 | Ramezani | G06N 3/044 |
| 2023/0325766 A1* | 10/2023 | Cella | G06N 5/043 |
| | | | 705/7.22 |

OTHER PUBLICATIONS

Ghiasi et al., "NAS-FPN: Learning Scalable Feature Pyramid Architecture for Object Detection," Proceedings of the IEEE/CVF Conference on Computer Vision and Pattern Recognition (CVPR), 2019, pp. 7036-7045 (Year: 2019).*

Pham et al., "Efficient Neural Architecture Search Via Parameter Sharing," Cornell University, 2018, pp. 1-11. <https://arxiv.org/pdf/1802.03268.pdf> Downloaded Jun. 9, 2021.

Cai et al., "Proxylessnas: Direct Neural Architecture Search On Target Task and Hardware," Cornell University, 2019, pp. 1-13. <https://arxiv.org/pdf/1812.00332.pdf> Downloaded Jun. 9, 2021.

Guo et al., "Single Path One-Shot Neural Architecture Search With Uniform Sampling," Cornell University, 2020, pp. 1-16. <https://arxiv.org/pdf/1904.00420.pdf> Downloaded Jun. 9, 2021.

Xiao et al., "Robust Cascade Reconstruction by Steiner Tree Sampling," Cornell University, 2018, pp. 1-11. <https://arxiv.org/pdf/1809.05812.pdf> Downloaded Jun. 9, 2021.

Stamoulis et al., "Single-Path Nas: Designing Hardware-Efficient Convnets in Less Than 4 Hours," Cornell University, 2019, pp. 1-16.

Chen et al., "Fasterseg: Searching for Faster Real-Time Semantic Segmentation," Cornell University, 2019, pp. 1-14.

* cited by examiner

METHOD AND DEVICE FOR CREATING A MACHINE LEARNING SYSTEM

CROSS REFERENCE

The present application claims the benefit under 35 U.S.C. § 119 of German Patent Application No. DE 102020208309.6 filed on Jul. 2, 2020, which is expressly incorporated herein by reference in its entirety.

FIELD

The present invention relates to a method for creating a machine learning system for segmentation and object detection, a computer program and a machine-readable storage medium.

BACKGROUND INFORMATION

The aim of an architecture search for neural networks is to fully automatically find a good network architecture in terms of a performance figure/metric for a given data record.

In order to implement the automatic architecture search in computationally efficient manner, various architectures in the search space may share the weights of their operations, as in the case of a one-shot NAS model, for example, described in Pham, H., Guan, M. Y., Zoph, B., Le, Q. V., & Dean, J. (2018), "Efficient Neural Architecture Search Via Parameter Sharing," arXiv preprint arXiv:1802.03268.

In this context, the one-shot model is typically constructed as a directed graph in which the nodes represent data and the edges represent operations that define a calculation rule and transfer the input node of the edge to the output node. The search space is made up of subgraphs (e.g., paths) in the one-shot model.

Since the one-shot model can be very large, individual architectures may be drawn from the one-shot model for the training, as pointed out, e.g., by Cai, H., Zhu, L., & Han, S. (2018), "Proxylessnas: Direct Neural Architecture Search on Target Task and Hardware," arXiv preprint arXiv:1812.00332. Typically, this is accomplished by drawing a single path from a defined input node to an output node of the network, as illustrated, for example, by Guo, Z., Zhang, X., Mu, H., Heng, W., Liu, Z., Wei, Y., & Sun, J. (2019), "Single Path One-Shot Neural Architecture Search with Uniform Sampling," arXiv preprint arXiv:1904.00420.

For certain tasks such as object detection or in the case of multi-task networks, it is necessary that the network have several outputs. Gradient-based training of the complete one-shot model may be modified for this case, as described, for example, by Chen, W., Gong, X., Liu, X., Zhang, Q., Li, Y., & Wang, Z. (2019), "FasterSeg: Searching for Faster Real-Time Semantic Segmentation," arXiv preprint arXiv:1912.10917. However, this in turn is not efficient in terms of memory, and does not show the drawing of architectures with branches and with different outputs during the training as part of an architecture search.

In addition, determination of a minimal spanning tree which connects one input to several outputs in a weighted and directed graph has been disclosed as a Steiner tree problem within the context of infection cascades by the authors Xiao, H., Aslay, C., & Gionis, A. in "Robust Cascade Reconstruction by Steiner Tree Sampling", available online: https://arxiv.org/abs/1809.05812.

SUMMARY

The present invention makes it possible to draw architectures for multi-task networks with several outputs and additional nodes within the network, and thus to carry out memory-efficient training of a one-shot model within the framework of an automatic architecture search.

In a first aspect, the present invention relates to a computer-implemented method for creating a machine learning system that is designed for segmentation and object detection in images, the machine learning system having one input for receiving the image and two outputs, a first output outputting the segmentation of the image and a second output outputting the object detection.

In accordance with an example embodiment of the present invention, the method includes the following steps:

Providing a directed graph, the graph having an input node, an output node and a number of further nodes. The output node is connected via the further nodes with the aid of directed edges, and the nodes represent data such as activation maps of layers of the machine learning system. The edges represent operations which define a calculation rule and transfer a first node of the edges to further nodes connected to the respective edge.

A path through the graph is then selected. In so doing, from the number of further nodes, a subset is first determined, all the nodes of which satisfy a predetermined characteristic with respect to data resolution. From this subset, at least one additional node (NOI) is selected which is used as output for the object detection. A path through the graph from the input node along the edges via the additional node (NOI) up to the output node is then selected.

This is then followed by creation of a machine learning system as a function of the selected path, and training of the machine learning system created, adapted parameters of the machine learning system being stored in the corresponding edges of the directed graph.

This is followed by repetitions of the previous step "selecting a path" and creation of the machine learning system based on the directed graphs.

The method in accordance with an example embodiment of the present invention may have the advantage that it permits efficient creation of a machine learning system, particularly an artificial neural network, for multi-task functions for image processing (e.g., gesture recognition or estimation of object distance, etc.). Additionally or alternatively, the tasks for the artificial neural network may be as follows: natural language processing, autoencoder, generative models, etc.

In accordance with an example embodiment of the present invention, it is provided that at least two additional nodes (NOI) be selected, and that the path through the graph have at least two routes, each of which running via one of the additional nodes to the output node. The two routes from the input node to the additional nodes, beginning at the additional nodes may be created independently of each other up to the input node. Alternatively, it may be said that a subgraph is determined. The subgraph includes the two routes; the routes in this case may then also be referred to as paths.

In addition, in accordance with an example embodiment of the present invention, it is provided that if a second route of the two routes encounters the already-drawn first route of the two routes, then the remaining portion of the first route is used for the second route.

In accordance with an example embodiment of the present invention, it is further provided that starting from the additional nodes, further routes be created up to the output node, the first and second route and the further routes yielding the path. It should be noted that the routes together then result in the path through the directed graph. That is, it may be said that the path has branches, when the routes meet.

In addition, in accordance with an example embodiment of the present invention, it is provided that further routes be drawn independently of each other, and if the further routes meet, then the route already drawn continues to be used.

This has the advantage that using this procedure, tendentially more optimal architectures which are smaller are able to be discovered.

Furthermore, in accordance with an example embodiment of the present invention, it is provided that during the training of the machine learning systems, a cost function be optimized, the cost function having a first function which assesses a performance capability of the machine learning system in terms of its segmentation and object identification, and having a second function which estimates a latency period of the machine learning system based on a length of the path and the operations of the edges.

Moreover, in accordance with an example embodiment of the present invention, it is provided that the path be selected randomly and that the edges have a drawing probability, the drawing probability of the edges being adjusted during the training of the machine learning system created, depending on the training success. The drawing probability characterizes the probability that the edge will be drawn for the path or route.

In addition, in accordance with an example embodiment of the present invention, it is provided that in creating the machine learning system, at least one softmax layer be appended to the additional node (NOI).

In further aspects, the present invention relates to a computer program which is designed to carry out the methods above, and a machine-readable storage medium on which this computer program is stored.

Below, specific embodiments of the present invention are explained in greater detail with reference to the figures.

DETAILED DESCRIPTION OF EXAMPLE EMBODIMENTS

In order to find good architectures of deep neural networks for a given data record, automatic methods, commonly known as neural architecture search methods, may be used for the architecture search. To that end, a search space of possible architectures of neural networks is defined explicitly or implicitly.

To describe a search space, hereinafter the term operation shall be used, which describes a calculation rule that transfers one or more n-dimensional input-data tensors to one or more output-data tensors, and in this context, may have adaptable parameters. For example, convolutions with different kernel sizes and different types of convolutions (regular convolution, depth-wise separable convolution) and pooling operations are often used as operations in the processing of images.

In the following, a calculation graph (the so-called one-shot model) shall also be defined, which contains all architectures in the search space as subgraphs. Since the one-shot model may be very large, individual architectures may be drawn from the one-shot model for the training. Typically, this is done by drawing individual paths from a defined input node to a defined output node of the network.

In the simplest case, if the calculation graph is made up of a chain of nodes that are able to be connected in each case via various operations, then for each two successive nodes, it is sufficient to draw the operation which connects them.

If the one-shot model is more generally a directed graph, a path may be drawn iteratively by beginning at the input, then drawing the next node and the connecting operation, and then continuing this procedure iteratively up to the destination node.

The one-shot model with drawing may then be trained by drawing an architecture for each minibatch and adjusting the weights of the operations in the drawn architecture with the aid of a standard gradient-step method. The finding of the best architecture may be carried out either as a separate step after the training of the weights, or may be carried out alternately with the training of the weights.

In order to draw architectures from a one-shot model which have branches and several outputs, in one specific embodiment, a sampling model for paths in the reverse direction may be used. To that end, for each output of the one-shot model, a path may be drawn which, beginning from the output, leads to the input of the one-shot model. To draw the paths, the transposed one-shot model may be considered, in which all directed edges point in the direction opposite of that in the original one-shot model.

As soon as the first path has been drawn, it may happen that the next node will reach a node of the previous path. In this case, the drawing of the current path may be terminated, since a path already exists from the shared node to the input.

Alternatively, it is possible to nevertheless continue to draw the path and perhaps obtain a second path to the input node.

In addition, the case shall be considered where the architectures drawn contain one or more nodes of the one-shot model which do not lie at full depth of the network and hereinafter are called NOI (nodes of interest), as well as an output at full depth of the one-shot model. In this case, the path may be created by a backwards-directed drawing for the NOIs in order to connect them to the input. Furthermore, a forwards-directed drawing is also carried out for each NOI, which leads to the output of the one-shot model. As in the case of the backwards-directed drawing, in the case of the forwards-directed drawing, the drawing may be discontinued as soon as a path is reached which already leads to the output.

As an alternative to the backwards-directed drawing, a purely forwards-directed drawing may be carried out, in that for each NOI, a path is drawn from the input to the corresponding NOI. This is achieved owing to the fact that the drawing is carried out only on the subgraph which is made up of all nodes that lie on one path from the input of the network to the current NOI, as well as all edges of the one-shot model between these nodes.

One exemplary embodiment is a multitask network for object detection and semantic segmentation. In this case, the NOIs are nodes to which an object detection head is attached. Moreover, at the output at full depth of the network, in addition an output for the semantic segmentation is used.

A specific embodiment of the present invention is described in the following:

The automatic architecture search requires first of all the creation of a search space (S21 in FIG. 6), which here is in the form of a one-shot model G. In this case, the one-shot model contains an input node (10), an output node (11) and several nodes in the middle (that is, not at full depth) of the model, which must be part of the drawn architecture and are called NOI (nodes of interest). In this context, the one-shot model must be designed so that all paths which begin at the input node lead to the output node (see FIGS. 1-5).

For each node in G, a probability distribution over the outgoing edges is defined. In addition, transposed one-shot model $G_t$ is considered, which has the same nodes, but all directed edges point in the reverse direction. A probability distribution over the outgoing edges is introduced for each node in $G_t$, as well, (this corresponds to a probability distribution over incoming edges in G).

Figure 1:
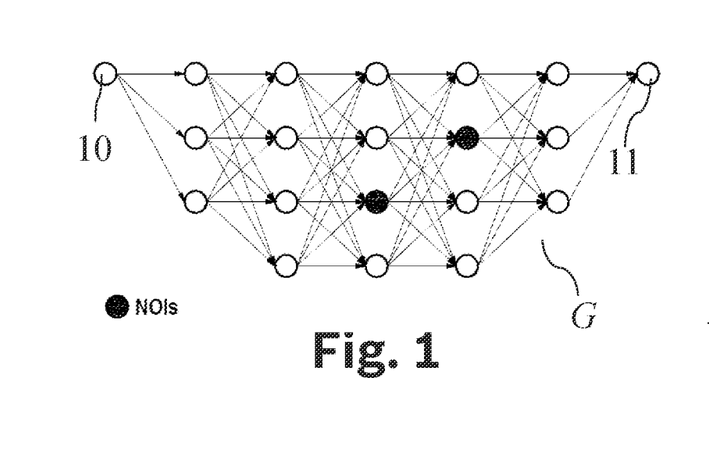
FIG. 1 shows schematically a one-shot model having an input node and an output node, as well as two nodes of interest (NOI) within the network.
Figure 2:
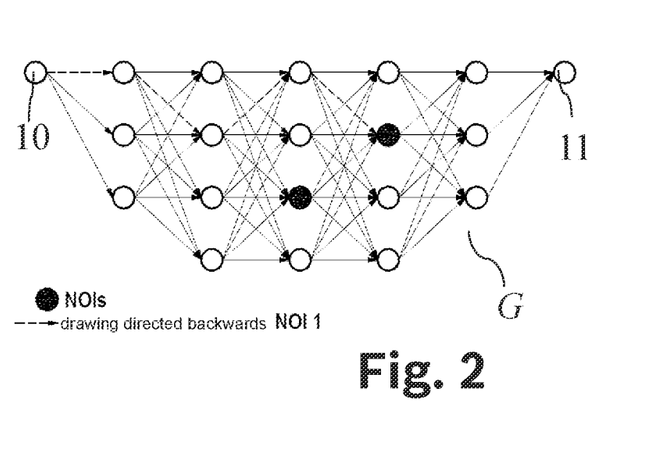
FIG. 2 shows schematically a first route drawn backwards from the first NOI to the input.
Figure 3:
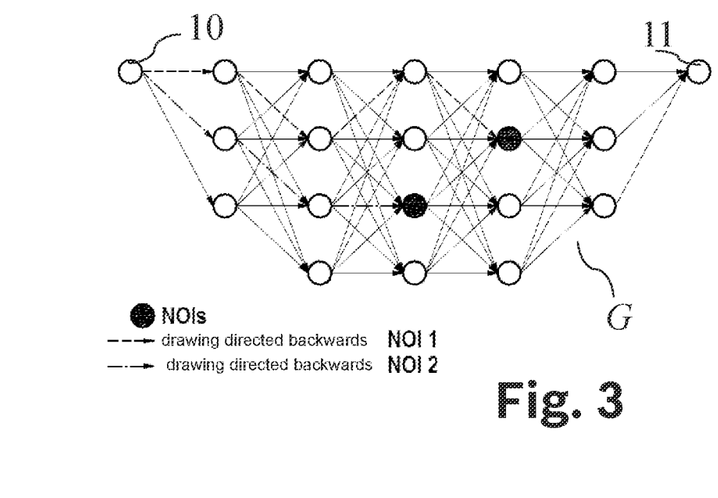
FIG. 3 shows schematically a second route drawn backwards from the second NOI to the input.
Figure 4:
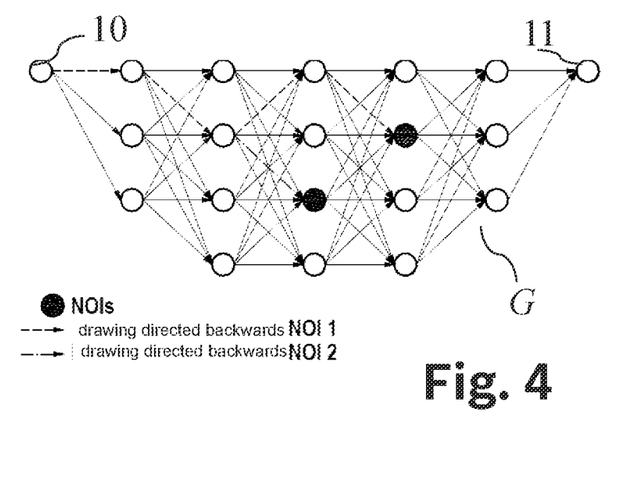
FIG. 4 shows schematically the second route drawn backwards from the second NOI to the input with discontinuation.

For the drawing directed backwards, a path is drawn in $G_t$ for the first NOI (S22 in FIG. 6), which leads from the NOI to the input of the one-shot model (see FIG. 2). This is repeated iteratively for all further NOIs (FIG. 3), in doing so, the drawing of the individual paths may be discontinued as soon as a node of a previous path to the input is reached (see FIG. 4). For the drawing directed forwards, a path is drawn in G for the first node NOI which leads from the NOI to the output of the one-shot model. This is repeated iteratively for all further NOIs, in doing so, the drawing of the individual paths may be discontinued as soon as a node of a previous path to the output is reached (see FIG. 5).

Figure 5:
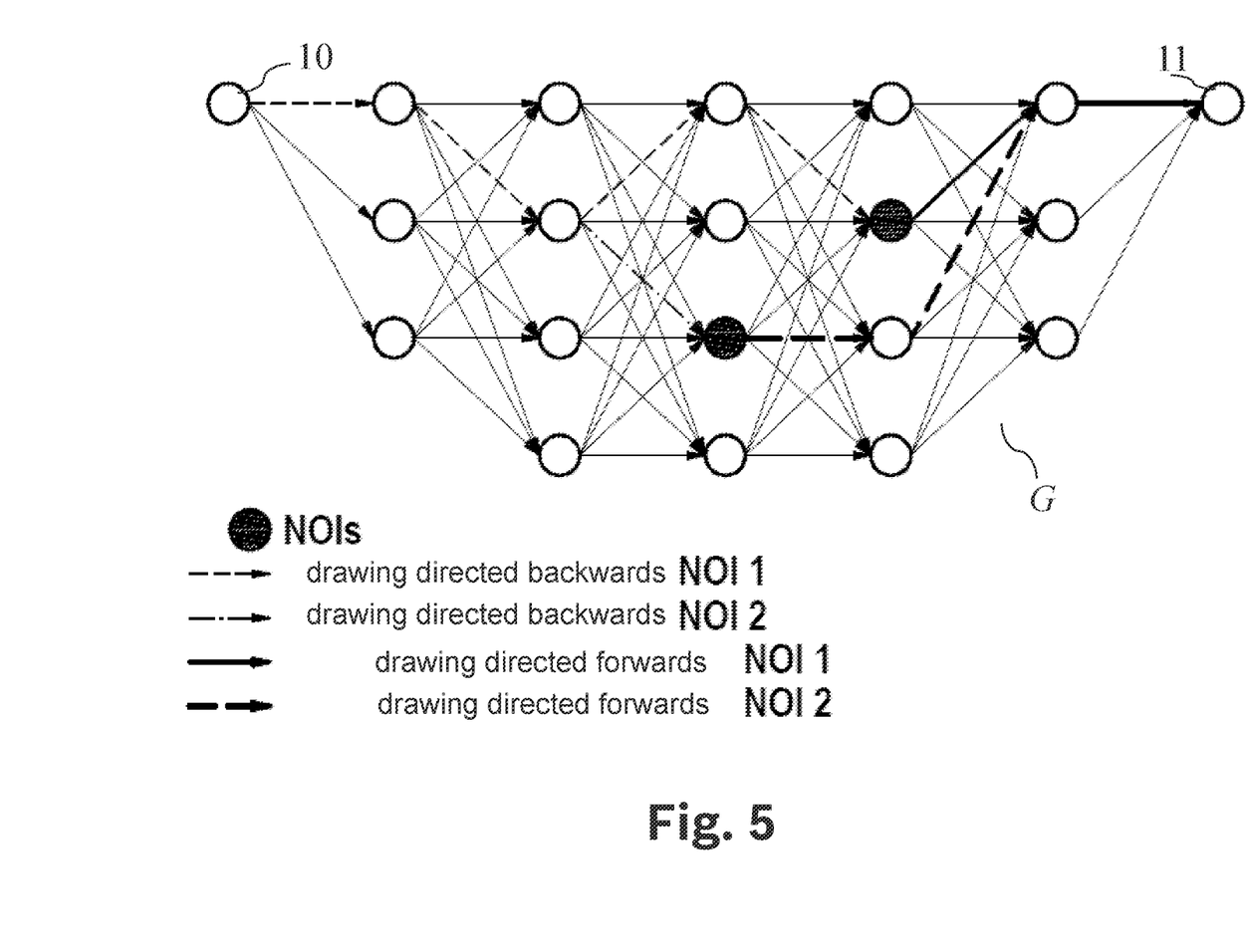
FIG. 5 shows schematically a forwards-directed drawing of two paths, beginning with the first to the output.
Figure 6:
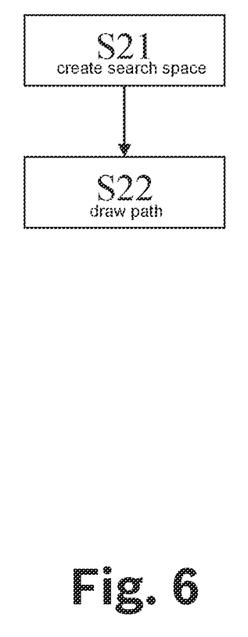
FIG. 6 shows a schematic representation of a flowchart of an example embodiment of the present invention.

FIG. 5 shows schematically a forwards-directed drawing of two paths, beginning with the first to the output. In this case, the drawing of the path from the second NOI is again discontinued, since a node of the path of the first NOI was reached. The architecture drawn altogether therefore contains both NOIs as well as the output node of the one-shot model.

The NOIs may be different in the case of each drawing of an architecture, since the probability distributions for backwards-directed and forwards-directed drawing are defined separately for all nodes.

An artificial neural network 60 (shown in FIG. 7) may then be created from graph G and utilized as explained in the following.

Figure 7:
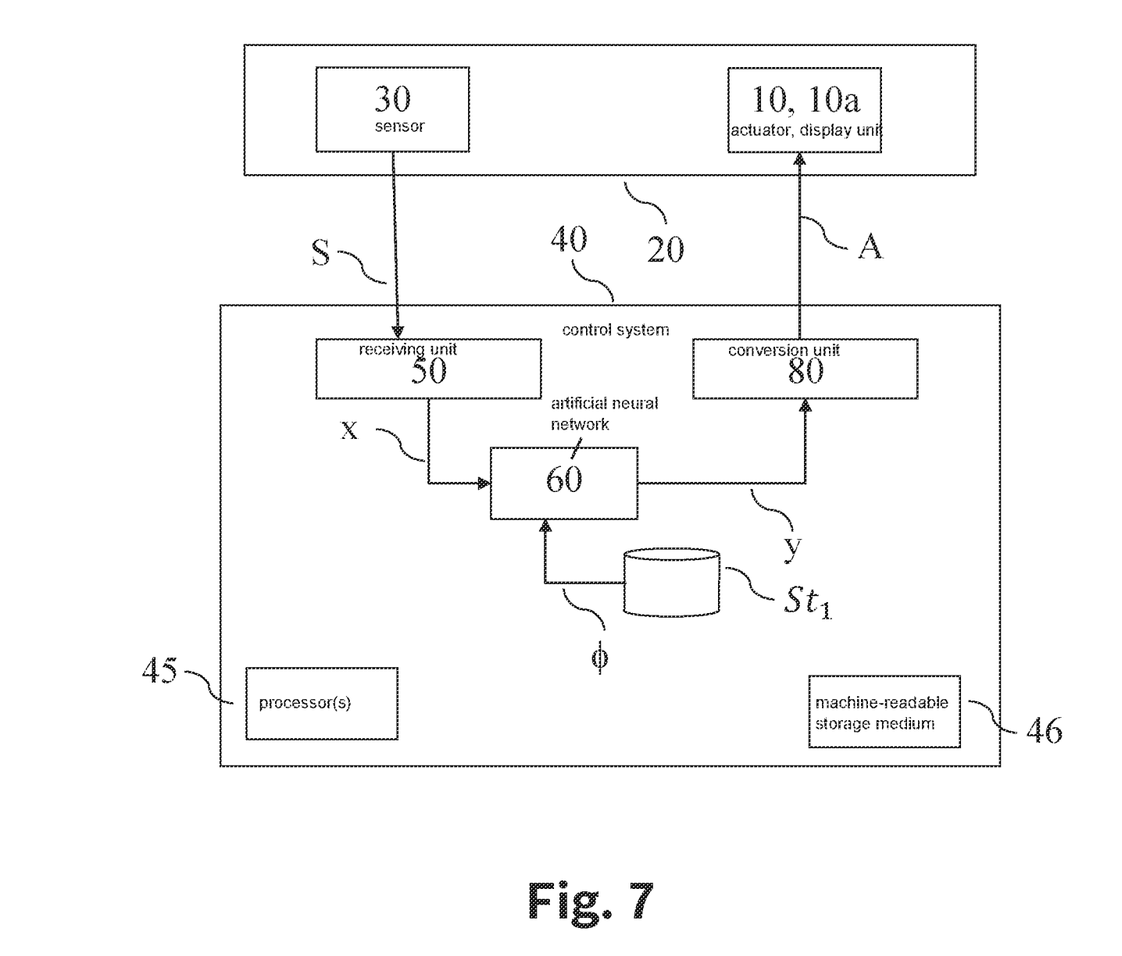
FIG. 7 shows a schematic representation of an actuator-control system, in accordance with an example embodiment of the present invention.

FIG. 7 shows an actuator 10 in its surroundings 20 in interaction with a control system 40. At preferably regular time intervals, surroundings 20 are detected in a sensor 30, particularly an imaging sensor such as a video sensor, which may also be provided by a plurality of sensors, e.g., a stereo camera. Other imaging sensors such as radar, ultrasound or lidar are also conceivable. A thermal imaging camera is conceivable, as well. Sensor signal S—or rather, one sensor signal S each in the case of several sensors—of sensor 30 is transmitted to control system 40. Control system 40 thus receives a sequence of sensor signals S. From them, control system 40 determines control signals A, which are transmitted to actuator 10.

Control system 40 receives the sequence of sensor signals S of sensor 30 in an optional receiving unit 50, which converts the sequence of sensor signals S into a sequence of input images x (alternatively, in each case sensor signal S may also be accepted directly as input image x). For example, input image x may be a section of, or a further processing of, sensor signal S. Input image x includes individual frames of a video recording. In other words, input image x is determined as a function of sensor signal S. The sequence of input images x is supplied to a machine learning system, an artificial neural network 60 in the exemplary embodiment.

By preference, artificial neural network 60 is parameterized by parameters $\phi$, which are stored in a parameter memory P that makes them available.

Artificial neural network 60 determines output quantities y from input images x. In particular, these output quantities y may include a classification and semantic segmentation of input images x. Output quantities y are fed to an optional conversion unit 80, which from them, determines control signals A that are supplied to actuator 10 in order to drive actuator 10 accordingly. Output quantity y includes information about objects which sensor 30 has detected.

Control system 40 also includes a monitoring unit 61 for monitoring the functioning of artificial neural network 60. Input image x is supplied to monitoring unit 61, as well. As a function thereof, monitoring unit 61 determines a monitoring signal d, which likewise is fed to conversion unit 80. Control signal A is determined as a function of monitoring signal d.

Monitoring signal d characterizes whether or not neural network 60 is determining output quantities y reliably. If monitoring signal d characterizes an unreliability, then, for example, control signal A may be determined according to a protected operating mode (while otherwise, it is determined in a normal operating mode). For example, the protected operating mode may include that a dynamic of actuator 10 is reduced, or that functionalities for driving actuator 10 are switched off.

Actuator 10 receives control signals A, is driven accordingly and carries out a corresponding action. In this case, actuator 10 may include a (not necessarily structurally integrated) control logic, which from control signal A, determines a second control signal with which actuator 10 is then controlled.

In further specific embodiments, control system 40 contains sensor 30. In other specific embodiments, control system 40 alternatively or additionally includes actuator 10, as well.

In further preferred specific embodiments, control system 40 includes one or more processors 45 and at least one machine-readable storage medium 46 on which instructions are stored which, when executed in processors 45, then prompt control system 40 to carry out the method according to the invention.

In alternative specific embodiments, alternatively or in addition to actuator 10, a display unit 10a is provided.

Figure 8:
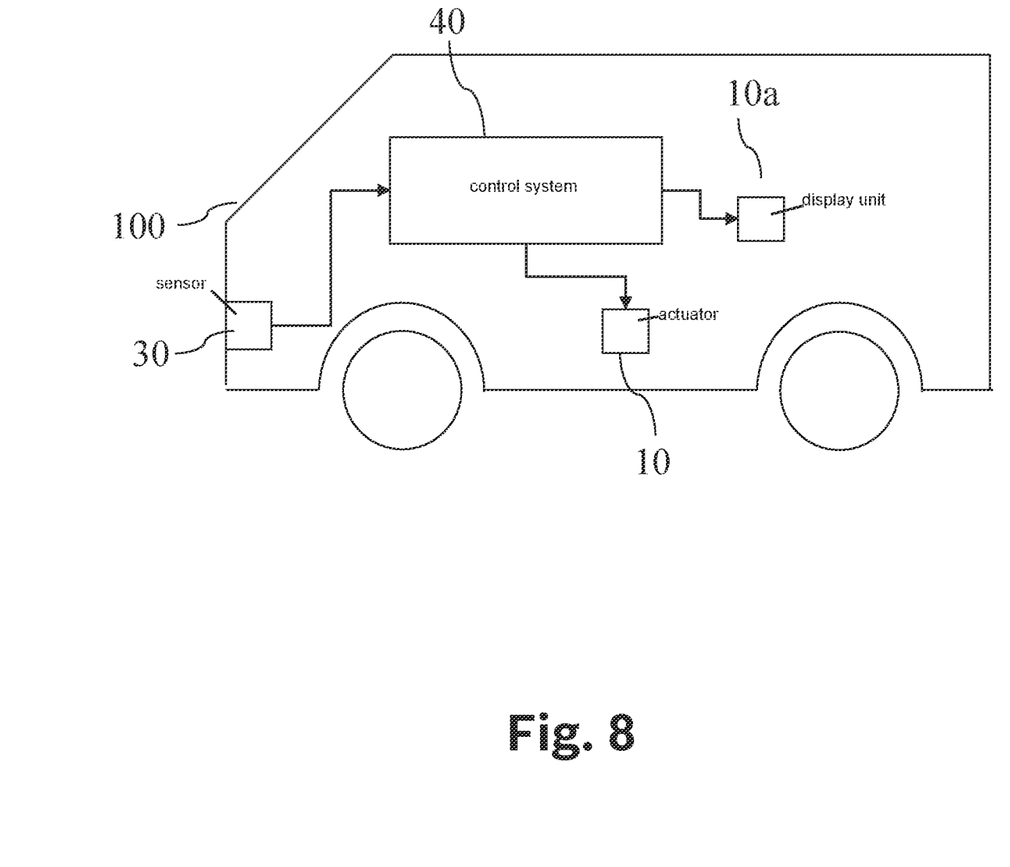
FIG. 8 shows an exemplary embodiment for the control of an at least semi-autonomous robot, in accordance with the present invention.

FIG. 8 shows how control system 40 may be used to control an at least semi-autonomous robot, here an at least semi-autonomous motor vehicle 100.

For example, sensor 30 may be a video sensor disposed preferably in motor vehicle 100.

Artificial neural network 60 is designed to reliably identify objects from input images x.

For example, actuator 10 disposed preferably in motor vehicle 100 may be a brake, a drive or a steering system of motor vehicle 100. Control signal A may then be ascertained in such a way that actuator or actuators 10 is/are controlled in a manner that, for example, motor vehicle 100 prevents a collision with the objects identified reliably by artificial neural network 60, especially if they are objects of certain classes, e.g., pedestrians.

Alternatively, the at least semi-autonomous robot may also be another mobile robot (not shown), for example, one which moves by flying, swimming, submerging or stepping. For instance, the mobile robot may also be an at least semi-autonomous lawn mower or an at least semi-autonomous cleaning robot. In these cases, as well, control signal A may be determined in a manner that the drive and/or steering of the mobile robot is/are controlled in such a way that, e.g., the at least semi-autonomous robot prevents a collision with objects identified by artificial neural network 60.

Alternatively or additionally, display unit 10a may be controlled by control signal A and, e.g., the ascertained safe areas are displayed. In the case of a motor vehicle 100 without automated steering, for instance, it is also possible for display unit 10a to be controlled by control signal A in such a way that it outputs a visual or acoustic warning signal if it is determined that motor vehicle 100 is in danger of colliding with one of the reliably identified objects.

Figure 9:
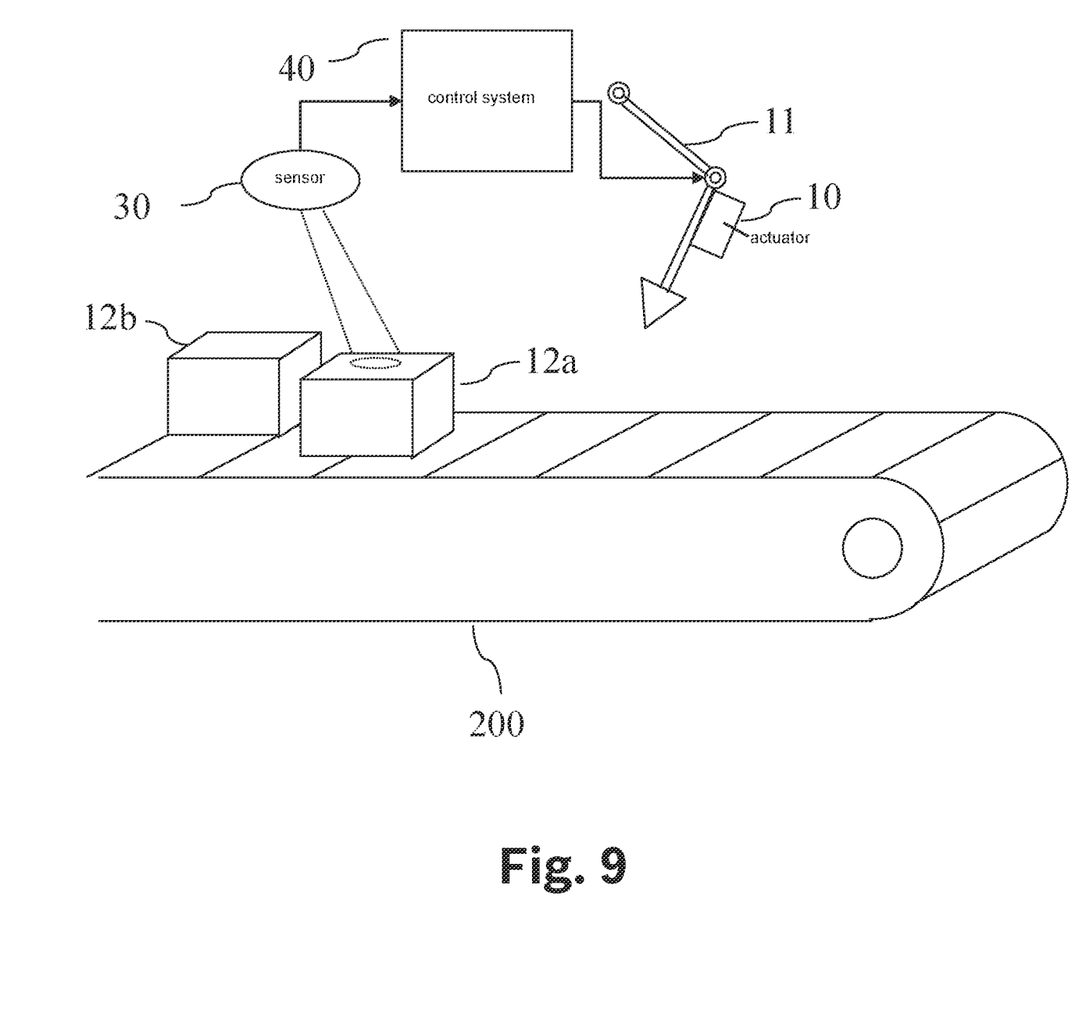
FIG. 9 shows schematically an exemplary embodiment for the control of a manufacturing system, in accordance with the present invention.

FIG. 9 shows an exemplary embodiment in which control system 40 is used to control a manufacturing machine 11 of a manufacturing system 200, by driving an actuator 10 controlling this manufacturing machine 11. For example, manufacturing machine 11 may be a machine for punching, sawing, drilling and/or cutting.

As an example, sensor 30 may then be an optical sensor which, e.g., detects properties of manufacturing articles 12a 12b. It is possible that these manufacturing articles 12a, 12b are movable. It is possible that actuator 10 controlling manufacturing machine 11 is driven as a function of an assignment of detected manufacturing articles 12a, 12b, so that manufacturing machine 11 executes a following processing step on the correct manufacturing article 12a, 12b, accordingly. It is also possible that by identification of the correct properties of the same one of manufacturing articles 12a, 12b (that is, without an incorrect assignment), manufacturing machine 11 adjusts the same manufacturing step accordingly for processing a following manufacturing article.

Figure 10:
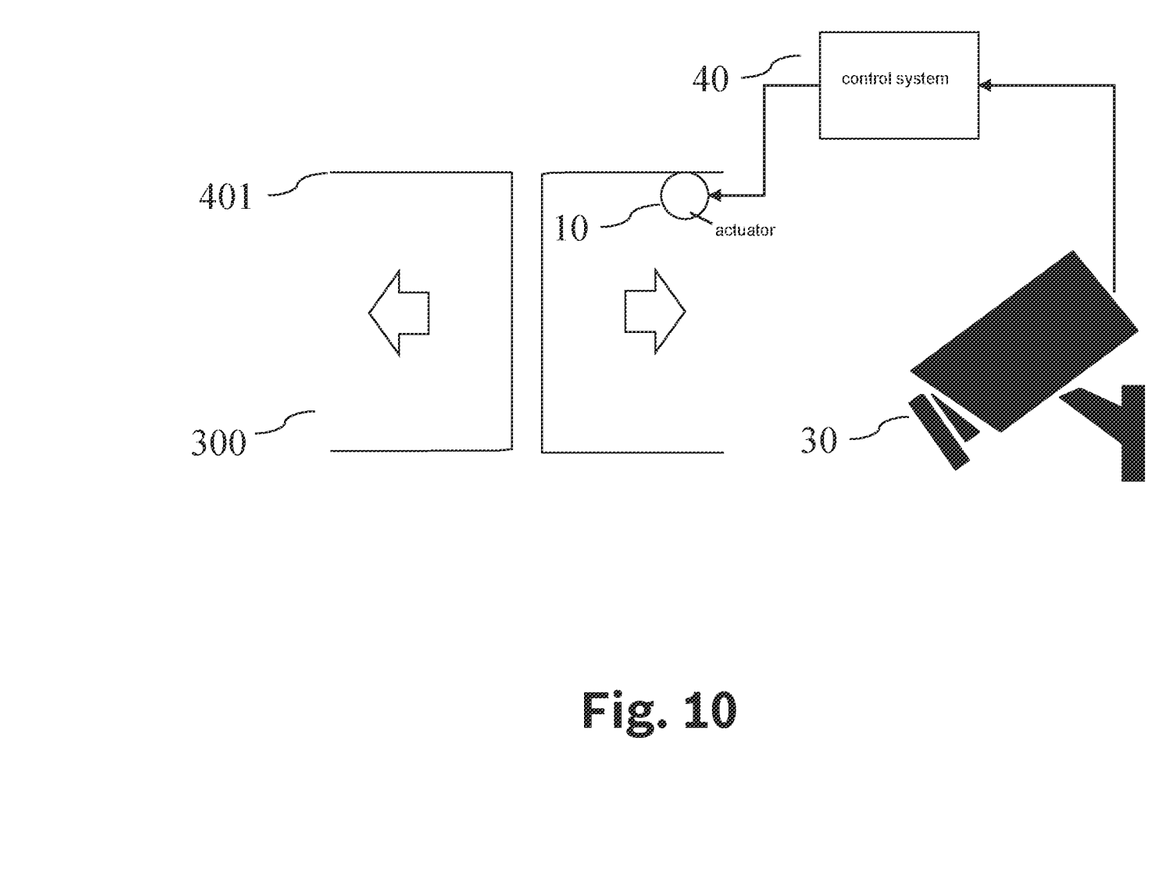
FIG. 10 shows schematically an exemplary embodiment for the control of an access system, in accordance with the present invention.

FIG. 10 shows an exemplary embodiment in which control system 40 is used to control an access system 300. Access system 300 may include a physical access control, e.g., a door 401. Video sensor 30 is set up to detect a person. This detected image is able to be interpreted with the aid of object identification system 60. If several people are detected simultaneously, by assigning the people (thus, the objects) to each other, for example, the identity of the people may be determined particularly reliably, e.g., by analyzing their movements. Actuator 10 may be a lock which does or does not release the access control, for example, does or does not open door 401, depending on control signal A. To that end, control signal A may be selected as a function of the interpretation of object-identification system 60, e.g., depending on the ascertained identity of the person. Instead of the physical access control, a logical access control may also be provided.

Figure 11:
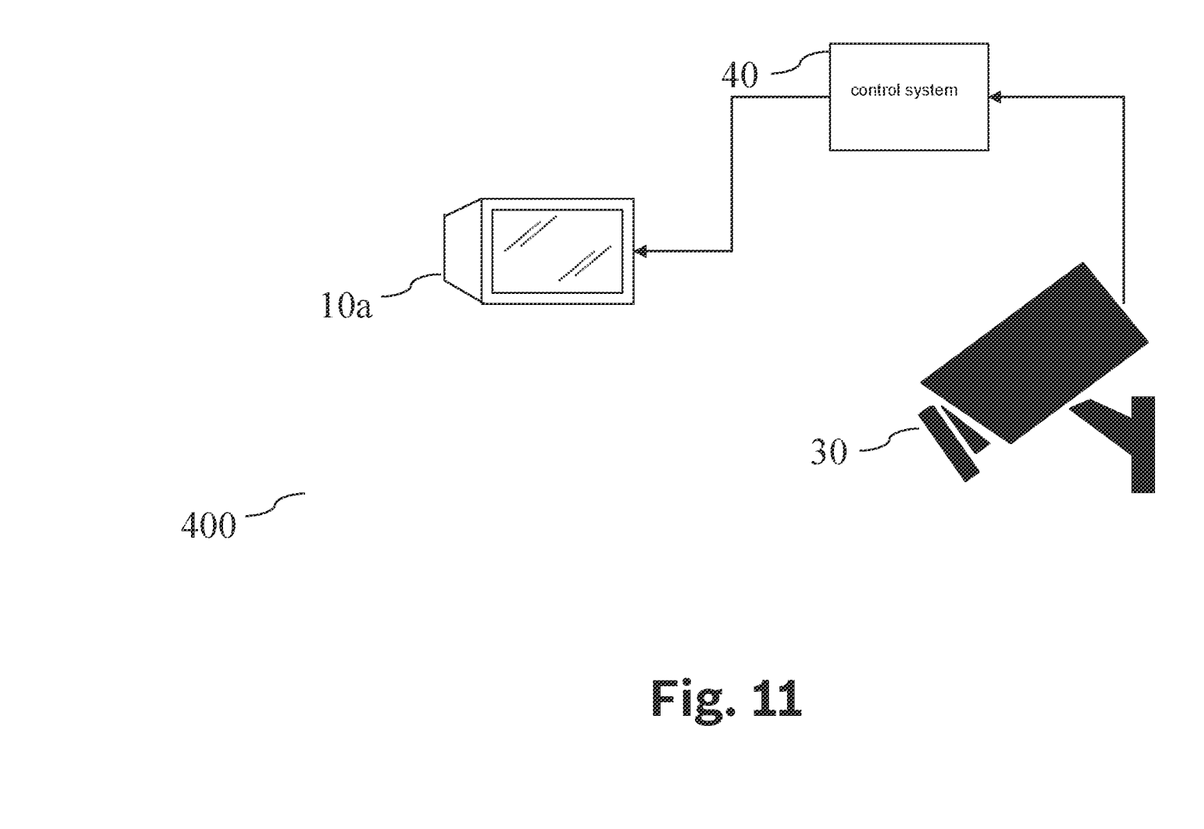
FIG. 11 shows schematically an exemplary embodiment for the control of a monitoring system, in accordance with the present invention.

FIG. 11 shows an exemplary embodiment in which control system 40 is used to control a monitoring system 400. This exemplary embodiment differs from the exemplary embodiment shown in FIG. 5 [sic], because instead of actuator 10, display unit 10a is provided which is controlled by control system 40. For example, an identity of the objects picked up by video sensor 30 may be determined reliably by artificial neural network 60 in order as a function thereof, to infer, for instance, which is becoming suspicious, and control signal A may then be selected in such a way that display unit 10a shows this object highlighted in terms of color.

Figure 12:
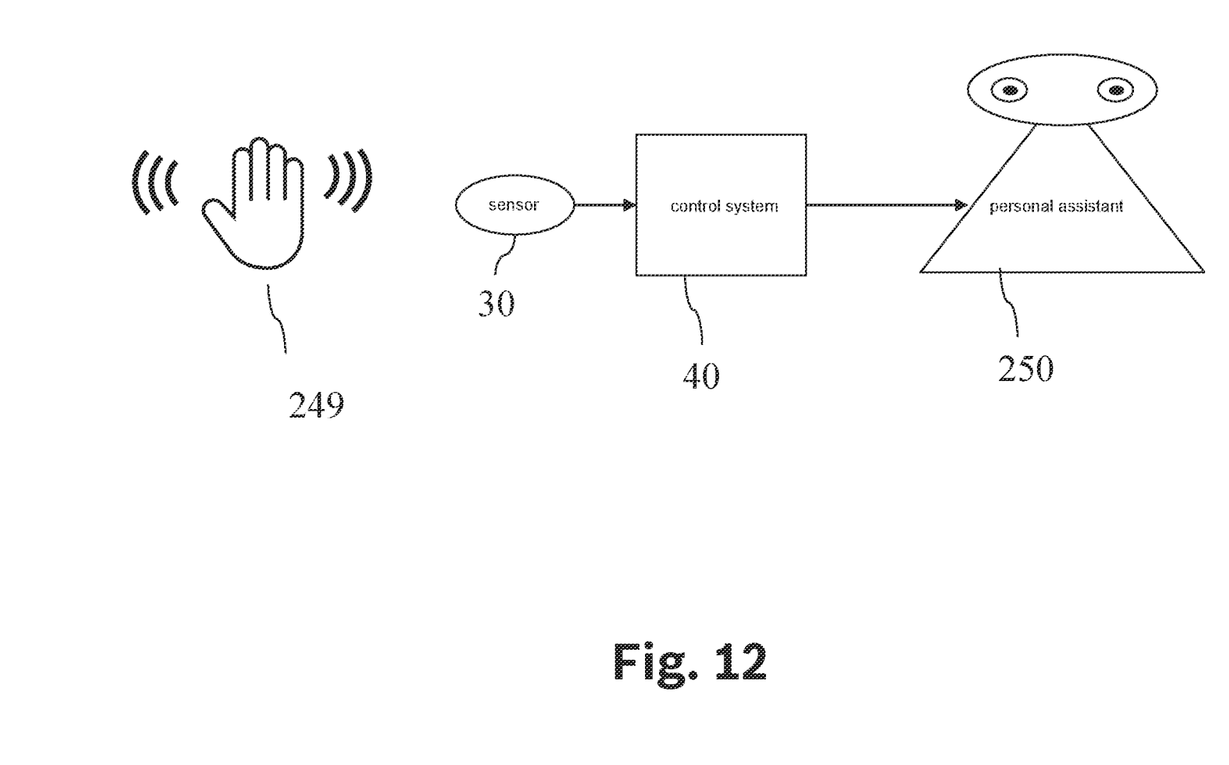
FIG. 12 shows schematically an exemplary embodiment for the control of a personal assistant, in accordance with the present invention.

FIG. 12 shows an exemplary embodiment in which control system 40 is used to control a personal assistant 250. Sensor 30 is preferably an optical sensor, which receives images of a gesture of a user 249.

Depending on the signals of sensor 30, control system 40 determines a control signal A of personal assistant 250, for example, in that the neural network implements a gesture recognition and identification. This determined control signal A is then transmitted to personal assistant 250, thus controlling it accordingly. In particular, this ascertained control signal A may be selected in such a way that it corresponds to a control presumed to be desired by user 249. This presumed desired control may be ascertained as a function of the gesture recognized by artificial neural network 60. Depending on the presumed desired control, control system 40 may then select control signal A for transmission to personal assistant 250 and/or may select control signal A for transmission to the personal assistant in accordance with presumed desired control 250 [sic].

For example, this corresponding control may include that personal assistant 250 retrieve information from a database and render it in a manner apprehensible for user 249.

Instead of personal assistant 250, a household appliance (not shown) may also be provided, particularly a washing machine, a range, a baking oven, a microwave or a dishwasher, in order to be controlled accordingly.

Figure 13:
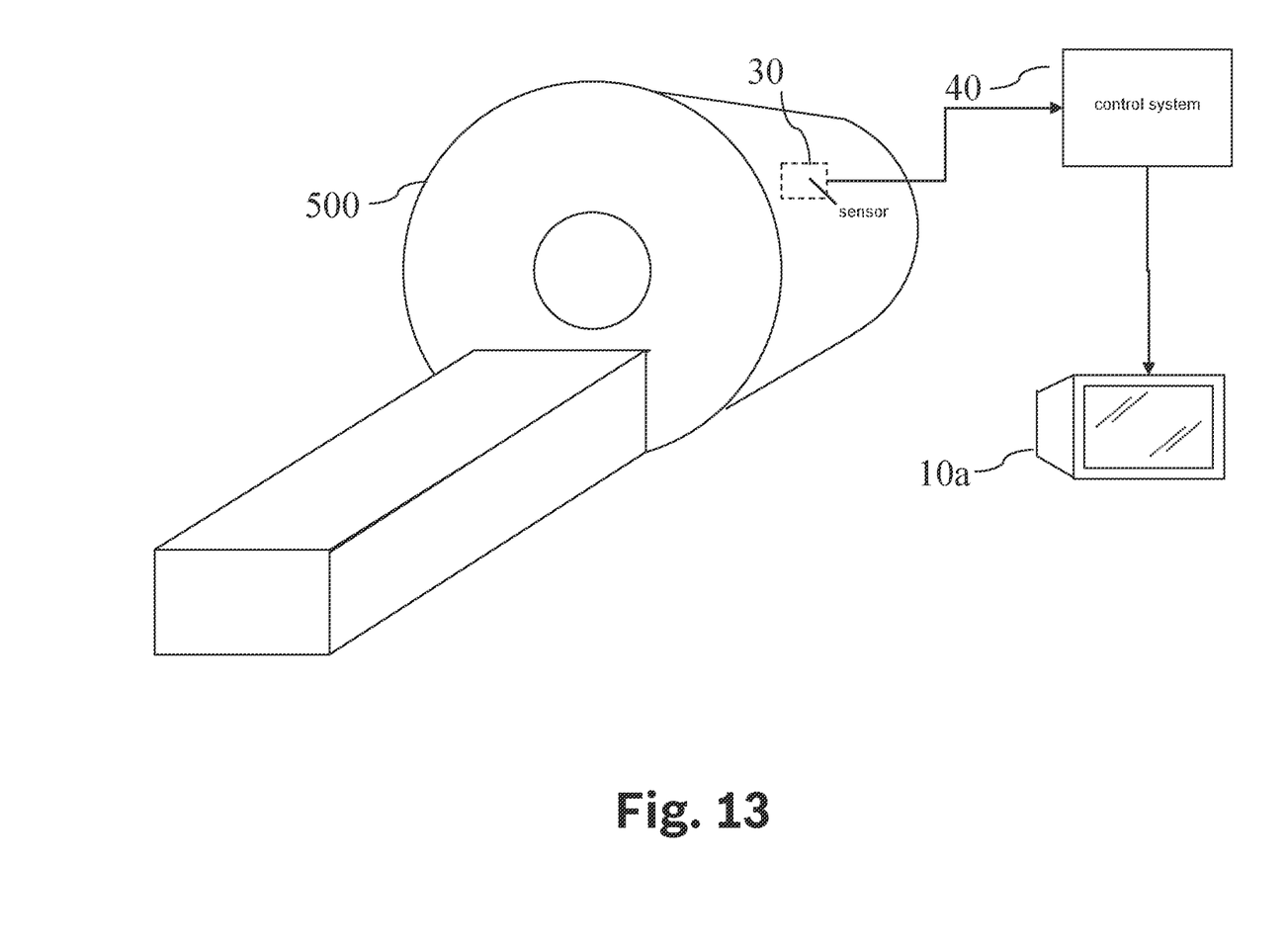
FIG. 13 shows schematically an exemplary embodiment for the control of a medical imaging system, in accordance with the present invention.

FIG. 13 shows an exemplary embodiment in which control system 40 is used to control a medical imaging system 500, e.g., an MRT machine, x-ray machine or ultrasonic device. For instance, sensor 30 may be provided by an imaging sensor; display unit 10a is controlled by control system 40. As an example, neural network 60 may determine whether an area picked up by the imaging sensor is suspicious, and control signal A may then be selected in such a way that this area is displayed highlighted in terms of color by display unit 10a.

Figure 14:
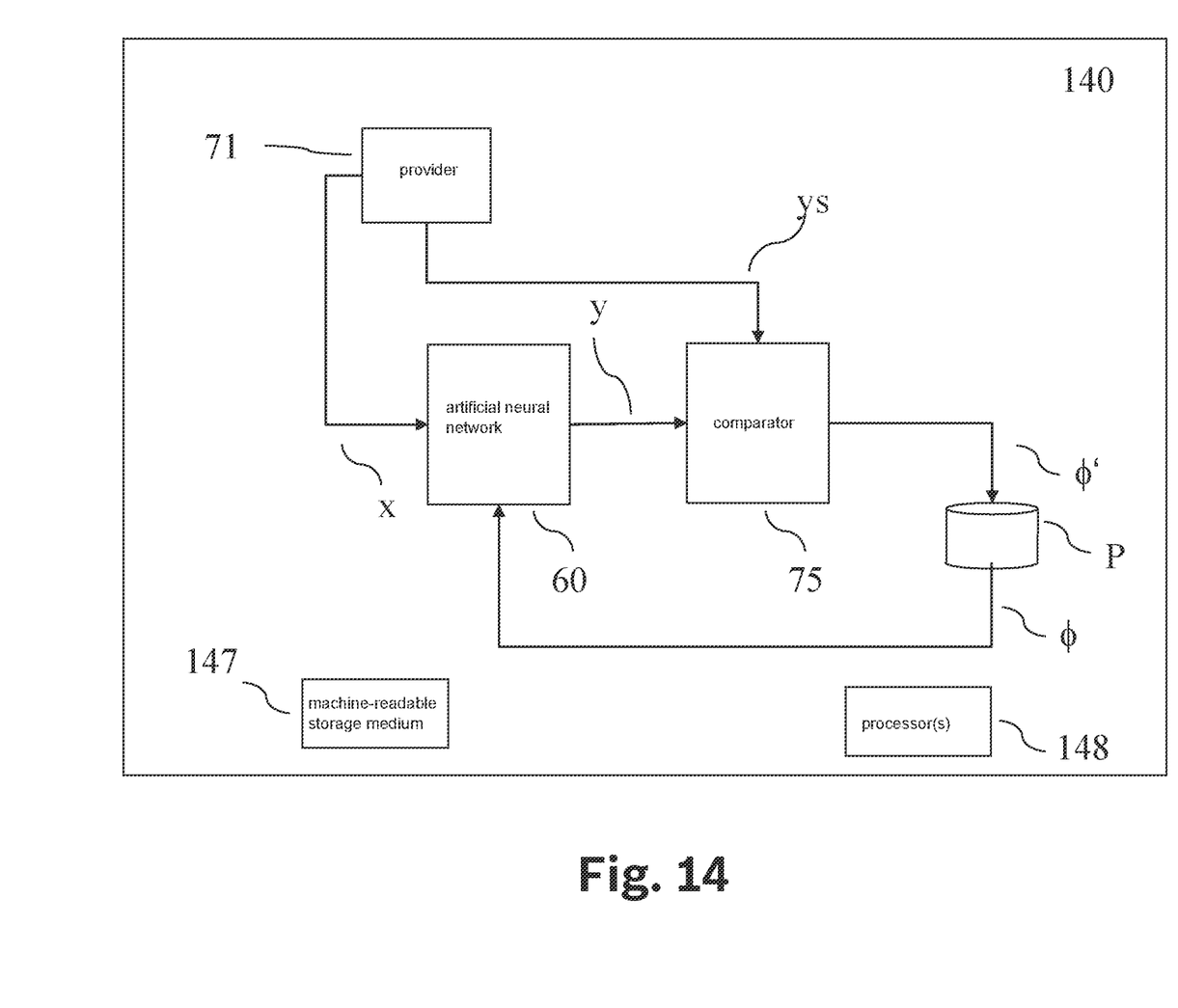
FIG. 14 shows a possible design of a training device, in accordance with an example embodiment of the present invention.

FIG. 14 shows an exemplary second training device 140 for a drawn machine learning system from graph G training neural network 60.[1] Training device 140 includes a provider 71, which provides input images x and desired output quantities ys, e.g., desired classifications. Input image x is supplied to artificial neural network 60 to be trained, which from it, determines output quantities y. Output quantities y and desired output quantities ys are fed to a comparator 75 which, depending on an agreement between respective output quantities y and desired output quantities ys, determines from them new parameters φ' that are transmitted to parameter memory P and replace parameters φ there.

[1] Translator's note: The German sentence is garbled. This is the best I can make of it.

The methods carried out by training system 140 may be implemented as a computer program stored on a machine-readable storage medium 147 and executed by a processor 148.

Of course, whole images do not have to be classified. It is possible that using a detection algorithm, for example, image sections may be classified as objects, these image sections may then be cut out, and a new image section may be generated if desired and inserted into the associated image in place of the cut-out image section.

The term "computer" includes any devices for processing predefinable calculation instructions. These calculation instructions may exist in the form of software, or in the form of hardware, or in a mixed form of software and hardware.

What is claimed is:

1. A computer-implemented method for creating a machine learning system that is configured for segmentation and object detection in images, the machine learning system having one input for receiving an image and two outputs, a first output of the two outputs outputting the segmentation of the image and a second output of the two outputs outputting the object detection, the method comprising the following steps:
    providing a directed graph, the directed graph having an input node, an output node, and a number of further nodes, the output node being connected via the further nodes using directed edges, and the nodes representing data and the edges representing operations that define a calculation rule and transfer a first node of the edges to further nodes connected to the respective edge;
    selecting a first respective path through the graph, including:
        from the number of further nodes, a subset is determined, all of whose nodes satisfy a predetermined characteristic with respect to data resolution,
        from the subset, at least two additional nodes are selected,
        the first selected respective path is a first path through the graph from the input node along the edges via a first one of the additional nodes up to the output node;
    creating a first respective machine learning system as a function of the selected first respective path, wherein, in the creating of the first respective machine learning system step, those of the further nodes and directed edges that are on the selected first respective path are included in the first respective machine learning system, and those of the further nodes and directed edges that are not on the selected first respective path are excluded from the respective machine learning system;
    training the created first respective machine learning system, and after the training of the created first respective machine learning system, adapted parameters of the first respective machine learning system being stored in corresponding edges of the directed graph;
    selecting a second respective path through the graph, wherein the second selected respective path is a path through the graph from the input node along the edges via a second one of the additional nodes up to the output node, the second one of the additional nodes being different from the first one of the additional nodes, and wherein the selected second respective path is different from the selected first path;
    creating a second respective machine learning system as a function of the selected second respective path, wherein, in the creating of the second respective machine learning system step, those of the further nodes and directed edges that are on the selected second respective path are included in the second respective machine learning system, and those of the further nodes and directed edges that are not on the selected second respective path are excluded from the respective machine learning system;
    training the created second respective machine learning system, and after the training of the created second respective machine learning system, adapted parameters of the created second respective machine learning system being stored in corresponding edges of the directed graph;
    and
    after the training of the created first and second respective machine learning systems, creating the machine learning system as a function of the directed graph.

2. The method as recited in claim 1, wherein when a second route of the two routes encounters the first route of the two routes, then a remaining portion of the first route is used for the second route.

3. The method as recited in claim 2, wherein starting from the additional nodes, further routes are created up to the output node, the first and second route and the further routes yielding the path.

4. The method as recited in claim 3, wherein further routes are drawn independently of each other, and when the further routes meet, then a route already drawn continues to be used.

5. The method as recited in claim 1, wherein during the training of each machine learning system of the created first and second respective machine learning systems, a cost function is optimized, the cost function having a first function which assesses a performance capability of the machine learning system in terms of segmentation and object detection, and having a second function which estimates a latency period of the machine learning system based on a length of the path and the operations of the edges.

6. A non-transitory machine-readable storage medium on which is stored a computer program for creating a machine learning system that is configured for segmentation and object detection in images, the machine learning system having one input for receiving an image and two outputs, a first output of the two outputs outputting the segmentation of the image and a second output of the two outputs outputting the object detection, the computer program, when executed by a computer, causing the computer to perform the following steps:
    providing a directed graph, the directed graph having an input node, an output node, and a number of further nodes, the output node being connected via the further nodes using directed edges, and the nodes representing data and the edges representing operations that define a calculation rule and transfer a first node of the edges to further nodes connected to the respective edge;
    selecting a first respective path through the graph, including:

from the number of further nodes, a subset is determined, all of whose nodes satisfy a predetermined characteristic with respect to data resolution, from the subset, at least two additional nodes are selected, the first selected respective path is a first path through the graph from the input node along the edges via a first one of the additional nodes up to the output node;

creating a first respective machine learning system as a function of the selected first respective path, wherein, in the creating of the first respective machine learning system step, those of the further nodes and directed edges that are on the selected first respective path are included in the first respective machine learning system, and those of the further nodes and directed edges that are not on the selected first respective path are excluded from the respective machine learning system;

training the created first respective machine learning system, and after the training of the created first respective machine learning system, adapted parameters of the first respective machine learning system being stored in corresponding edges of the directed graph;

selecting a second respective path through the graph, wherein the second selected respective path is a path through the graph from the input node along the edges via a second one of the additional nodes up to the output node, the second one of the additional nodes being different from the first one of the additional nodes, and wherein the selected second respective path is different from the selected first path;

creating a second respective machine learning system as a function of the selected second respective path, wherein, in the creating step of the second respective machine learning system, those of the further nodes and directed edges that are on the selected second respective path are included in the second respective machine learning system, and those of the further nodes and directed edges that are not on the selected second respective path are excluded from the respective machine learning system;

training the created second respective machine learning system, and after the training of the created second respective machine learning system, adapted parameters of the created second respective machine learning system being stored in corresponding edges of the directed graph;

and after the training of the created first and second respective machine learning systems, creating the machine learning system as a function of the directed graph.

7. A device configured to create a machine learning system that is configured for segmentation and object detection in images, the machine learning system having one input for receiving an image and two outputs, a first output of the two outputs outputting the segmentation of the image and a second output of the two outputs outputting the object detection, the device configured to:

provide a directed graph, the directed graph having an input node, an output node, and a number of further nodes, the output node being connected via the further nodes using directed edges, and the nodes representing data and the edges representing operations that define a calculation rule and transfer a first node of the edges to further nodes connected to the respective edge;

select a first respective path through the graph, including:

from the number of further nodes, a subset is determined, all of whose nodes satisfy a predetermined characteristic with respect to data resolution, from the subset, at least two additional nodes are selected, the first selected respective path is a first path through the graph from the input node along the edges via at first one of the additional nodes up to the output node;

create a first respective machine learning system as a function of the selected first path; wherein, in the creation of the first respective machine learning system, those of the further nodes and directed edges that are on the selected first respective path are included in the respective machine learning system, and those of the further nodes and directed edges that are not on the selected first respective path are excluded from the respective machine learning system; and train the created first respective machine learning system, and after the training of the created first respective machine learning system, adapted parameters of the respective first machine learning system being stored in corresponding edges of the directed graph;

select a second respective path through the graph, wherein the second selected respective path is a path through the graph from the input node along the edges via a second one of the additional nodes up to the output node, the second one of the additional nodes being different from the first one of the additional nodes, and wherein the selected second respective path is different from the selected first path;

create a second respective machine learning system as a function of the selected second respective path, wherein, in the creation of the second respective machine learning system, those of the further nodes and directed edges that are on the selected second respective path are included in the second respective machine learning system, and those of the further nodes and directed edges that are not on the selected second respective path are excluded from the respective machine learning system;

train the created second respective machine learning system, and after the training of the created second respective machine learning system, adapted parameters of the created second respective machine learning system being stored in corresponding edges of the directed graph;

and after the training of the created first and second respective machine learning systems, create the machine learning system as a function of the directed graph.

* * * * *